US005926611A

United States Patent [19]
Yang et al.

[11] Patent Number: 5,926,611
[45] Date of Patent: Jul. 20, 1999

[54] HIGH RESOLUTION DIGITAL RECORDER AND METHOD USING LOSSY AND LOSSLESS COMPRESSION TECHNIQUE

[75] Inventors: Chao-Kung Yang, Huntington Beach; Jim C. Williams, Anaheim; Stanley Krutsick, Fullerton, all of Calif.

[73] Assignee: Hughes Electronics Corporation, El Segundo, Calif.

[21] Appl. No.: 08/771,071

[22] Filed: Dec. 20, 1996

Related U.S. Application Data

[63] Continuation of application No. 08/250,134, May 26, 1994, abandoned.

[51] Int. Cl.⁶ .................................................... H04N 7/26
[52] U.S. Cl. ............................................ 386/112; 348/397
[58] Field of Search ................... 386/1, 4, 6, 37, 386/111, 112, 109, 123; 348/384, 390, 400, 409, 410, 401, 699, 397; 358/426; 345/133; 395/114, 154; H04N 5/76, 5/92, 9/79

[56] References Cited

U.S. PATENT DOCUMENTS

| | | |
|---|---|---|
| 4,789,961 | 12/1988 | Tindall . |
| 4,873,573 | 10/1989 | Thomas et al. .......................... 358/133 |
| 5,128,776 | 7/1992 | Scorse et al. ............................ 358/426 |
| 5,130,786 | 7/1992 | Murata et al. ......................... 358/21 R |
| 5,218,431 | 6/1993 | Gleicher et al. ........................... 358/13 |
| 5,237,413 | 8/1993 | Israelsen et al. ......................... 358/160 |
| 5,253,078 | 10/1993 | Balkanski et al. ....................... 358/426 |
| 5,347,600 | 9/1994 | Barnsley et al. ........................... 382/56 |
| 5,375,068 | 12/1994 | Palmer et al. ........................... 364/514 |
| 5,432,871 | 7/1995 | Novik ..................................... 382/232 |
| 5,434,592 | 7/1995 | Dinwiddie, Jr. et al. ............... 345/133 |
| 5,537,529 | 7/1996 | Borovoy et al. ......................... 348/699 |

FOREIGN PATENT DOCUMENTS

| | | |
|---|---|---|
| A-0 402 954 | 12/1990 | European Pat. Off. . |
| A-0 487 282 | 5/1992 | European Pat. Off. . |
| A-0 498 544 | 12/1992 | European Pat. Off. . |
| A-0 583 107 | 2/1994 | European Pat. Off. . |
| WO 94/11993 | 5/1994 | WIPO . |

OTHER PUBLICATIONS

"Challenges in Full–Motion Video/Audio for Personal Computers", by E. J. Kroeker, SMPTE Journal, vol. 102, No. Jan. 1, 1993, pp. 24–31 XP 000335940.

"The Integration of High Resolution Video into the Workstation", by J.D. Northcutt, G.A. Wall, J. F. Hanko, 1993 SID International Symposium Digest of Technical Papers, Seattle, May 16–21, 1993. Vol. 24, Pt. 1, pp. 1019–1022.

"Windows Accelerator Chip Provides Multimedia Port" by J. Shandle, Electronic Design, vol. 41, No. 13, Jun. 24, 19983.

"Viceotaping Your Computer's Output" by Stanley Planton and Susan Phillips, Database, vol. 11, No. 4, Aug. 1988, pp. 66–70.

"Farallon Computing Extends The Meaning of Personal Computing" by Steve Cisler, Database, vol. 13, No. 1, Feb. 1990, pp. 84–86.

Eigen, "The Digital Pathway to the Future," Eigen Product Brochure, May 1993.

*Primary Examiner*—Tommy P. Chin
*Assistant Examiner*—Y. Lee
*Attorney, Agent, or Firm*—Michael W. Sales

[57] ABSTRACT

A machine independent high resolution digital screen recorder provides high quality video displays with manageable storage capacity and bandwidth. The screen recorder includes an analog to digital frame grabber for converting the high resolution video signal that modulates a video display into RGB sequences of digital frames. A video compression unit separates the high and low variance portions of the digital frames, encodes them with respective lossy and lossless compression algorithms and stores them in a mass storage device.

8 Claims, 7 Drawing Sheets

HIGH RESOLUTION DIGITAL RECORDER AND METHOD USING LOSSY AND LOSSLESS COMPRESSION TECHNIQUE

This is a continuation application Ser. No. 08/250,134, filed May 26, 1994, now abandoned.

BACKGROUND OF THE INVENTION

1. Field of the Invention

The present invention generally relates to the field of screen recorders, and more specifically to a high resolution digital screen recorder and recording method that converts an analog RGB video signal into a compressed digital signal.

2. Description of the Related Art

Conventional color televisions and display monitors produce relatively low resolution and bandwidth red, green and blue (RGB) video signals, e.g. 400–600 lines per frame at 25–30 frames per second, that conform to one of several international standards. Three of the most common standards are: the National Television Systems Committee (NTSC) standard with 525 lines per frame at 30 frames per second, the Sequential Chrominance Signal & Memory (SECAM) standard with 625 lines per frame at 25 frames per second and the Phase Alternating Line (PAL) standard with 625 lines per frame at 25 frames per second. These standards are fairly flexible in that the number of scan lines actually used by a display may be significantly less than the specified standard. For these low resolution signals, video recording devices, such as video cassette recorders (VCRs), record the analog signal directly onto a magnetic tape.

For high resolution workstation monitors having 1280 or greater scan lines per frame, or high definition television HDTV), it is not currently feasible to record the analog video signals directly onto the tape in an analog format at the same high resolution. The storage requirements and bandwidth of the video signals exceed the capabilities of analog recording devices. For example, a 1280×1024 video signal at 3 bytes per pixel and 30 frames per second recorded for 3 hours would require 1274 Gbytes of memory and a bandwidth of 943 Mbps. As a result, in a current approach a scan converter is used to convert the high resolution video signal into one of the low resolution standard formats, which is recorded onto the tape. The down conversion is done by averaging adjacent scan lines or simply skipping scan lines, and results in a substantial loss of resolution when the recorded tapes are played back. The "RGB/Videolink 1600U", RGB Spectrum of Berkeley, Calif., 1991 is described in a product bulletin as one example of a scan converter. The loss of resolution is particularly bothersome in a multimedia workstation, a typical display includes text, graphics, pictures, audio and motion picture video data. The graphic icons and text are distorted by converting the high resolution signal to the relatively coarse low resolution signal. This system sacrifices image quality to maintain manageable storage requirements and bandwidth. For applications where the replayed information is required to faithfully reconstruct events, e.g., air traffic control displays or is critical to litigation, the loss of dielity may make the recording unuseable.

SUMMARY OF THE INVENTION

The present invention seeks to provide a machine independent, high resolution digital screen recorder that provides high quality video displays with manageable storage capacity and bandwidth, and can be implemented as a standalone or integrated unit.

This is accomplished with a screen recorder for recording a high resolution analog multi-color video signal, preferably RGB, that modulates a video display. An analog to digital frame grabber converts the high resolution video signal into sequences of digital frames. A video compression unit encodes the sequences of digital frames into compressed digital signals and stores them in a mass storage device.

In a preferred embodiment, a high resolution multimedia computer workstation displays high variance (motion picture video) and low variance (graphics, text, icons and background) data and produces the video signal to modulate its display. The video compression unit separates the high and low variance portions of the digital frames and encodes them with lossy and lossless compression algorithms, respectively.

For a better understanding of the invention, and to show how the same may be carried into effect, reference will now be made, by way of example, to the accompanying drawings.

DETAILED DESCRIPTION OF THE INVENTION

Figure 1:
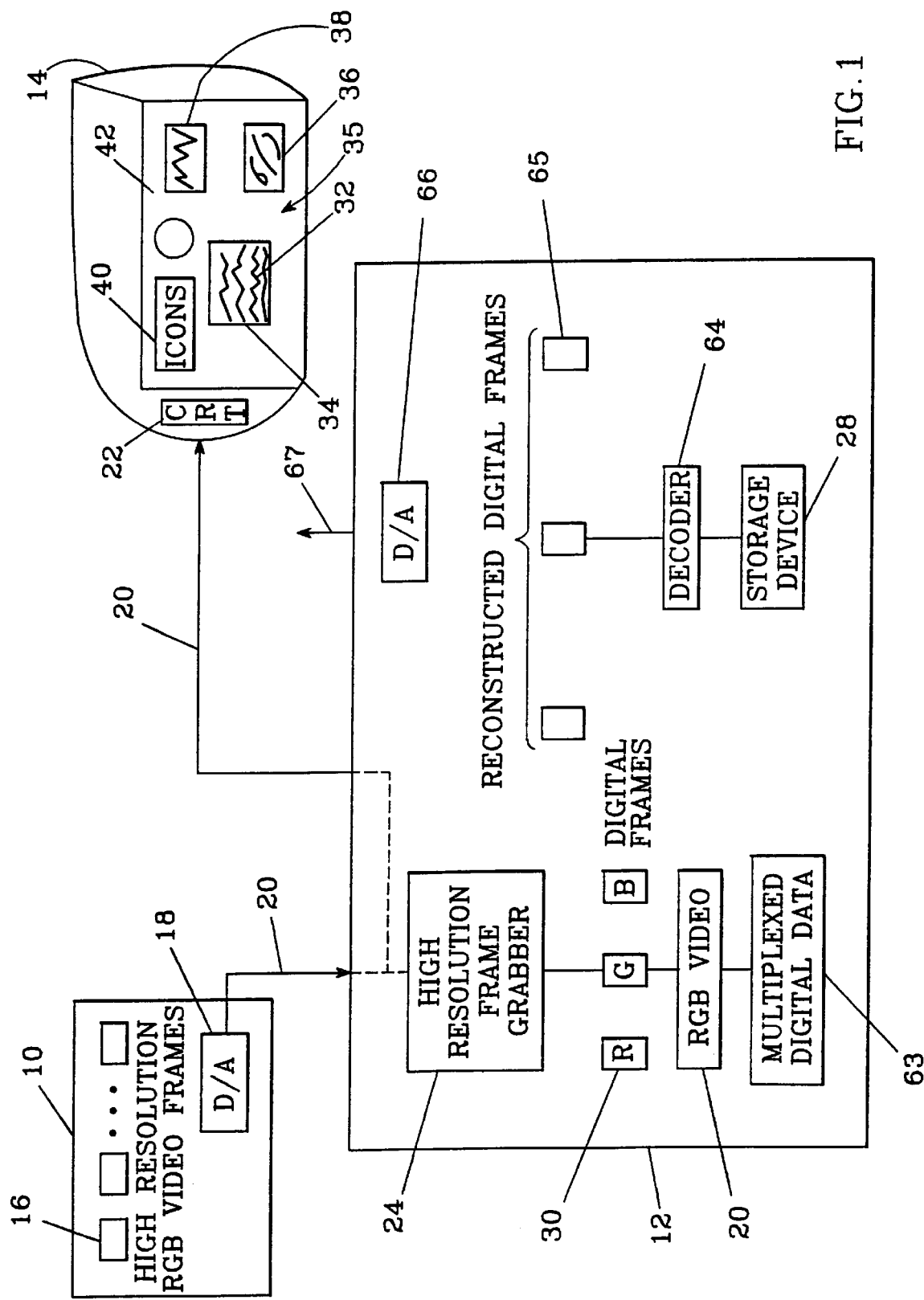
FIG. 1 is a block diagram of a high resolution computer workstation and a digital screen recorder.

High resolution multimedia computer workstations operate in a windowing environment that consists of several text and graphics windows, a motion video window, icons, a cursor and possibly audio signals, and in some applications live sensor images such as radar may also be present. A typical display has a resolution of at least 1280×1024 pixels and is refreshed at a rate of 30 frames or higher per second, although the invention is applicable for arbitrary resolutions and frame rates. FIG. 1 shows a high resolution multimedia computer workstation 10 that is electrically connected through a screen recorder 12 to a monitor 14. Typical workstations have a single video output for the monitor, and thus to display the video signal in real time and store it as a compressed digital signal for future playback, the monitor and screen recorder are connected in a "loopthrough" configuration that is similar to a TV/VCR connection. The workstation internally generates high resolution digital RGB video frames 16 in a machine dependent format in response to the windowing environment, graphics, text or motion video applications and uses a D/A converter 18 to convert them into an analog RGB video signal 20. The frames' resolution and rate are included as sideband information in the video signal. The analog video signal 20 modulates the intensity of a cathode ray tube (CRT) 22 in the monitor 14 to raster scan the RGB images 16 onto the display at the given frame rate. The screen recorder 12 captures the video signal 20 and stores it as a compressed digital signal.

The screen recorder can be a stand-alone, workstation independent unit as shown, or it can be integrated into the workstation. In the preferred embodiment, the screen recorder is-connected to only video and/or audio outputs of the workstation's digital display system and does not require any information from internal components of the display. Thus, the invention is not dependent on the implementation of any specific display and may be applied to a variety of devices. The screen recorder includes a high resolution frame grabber 24, a digital video compression unit 26 and a mass digital storage device 28. The frame grabber converts the analog RGB video signal 20 in real time into another sequence of RGB digital frames 30 in a machine independent format. A suitable frame grabber, HI*DEF 111, is described in a new product bulletin from IMAGRAPH of Chelmsford, Massachusetts and claims a 160 Mhz bandwidth for capturing standard and non-standard video signals with up to 16K×16K resolution. The compression unit 26 compresses the video frames 30 at a ratio of approximately 250:1 with only slight visual degradation and maintains reasonable bandwidths and memory requirements. The compressed digital video signal is stored in the storage device 28, which can be a conventional hard drive, an optical drive or a portable device such as a digital tape.

Figure 2:
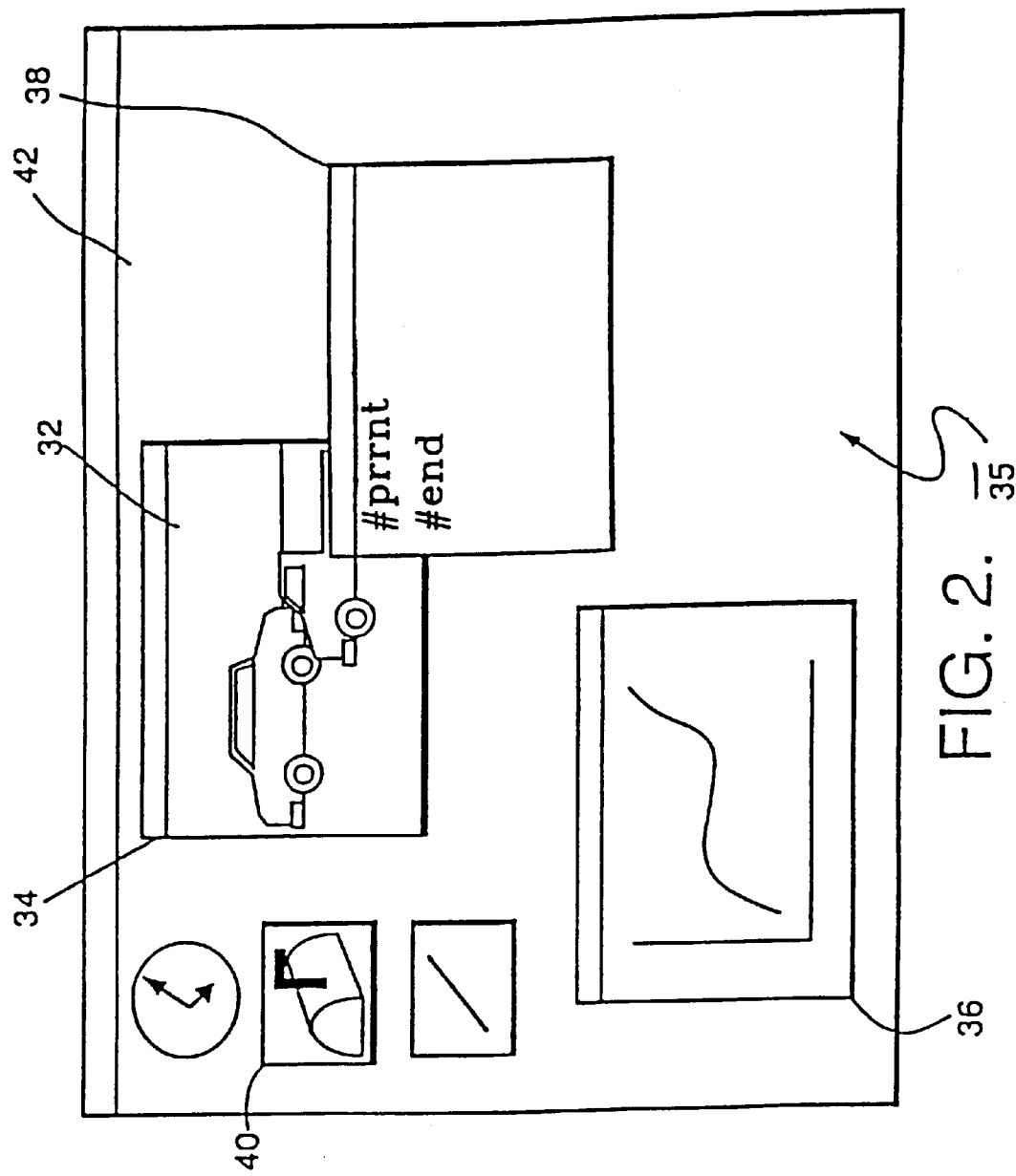
FIG. 2 shows a typical multimedia display.
Figure 3:
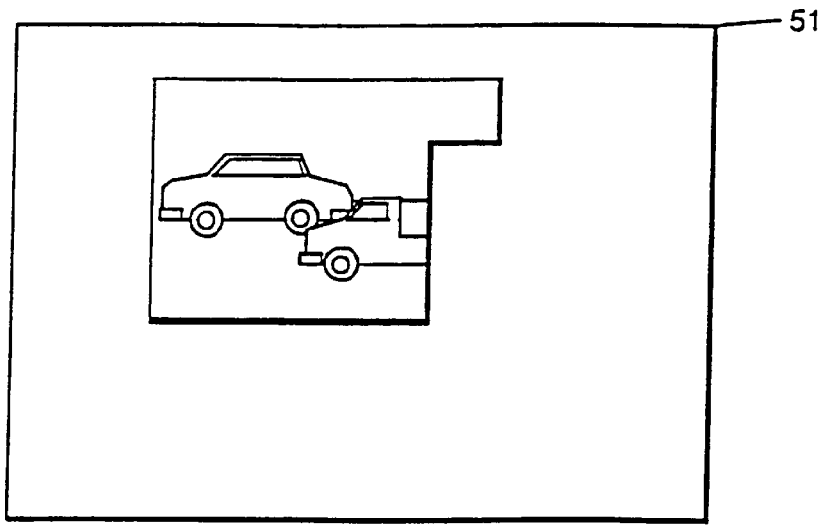
FIG. 3 shows a difference frame for the display of FIG. 2.

In the invention, the multimedia display is separated into high and low variance portions for the purpose of compressing the digital video signal 30. The high variance portion 32 is defined by a video window 34 in which some type of motion picture video signal is being played, while the low variance portion 35 is everything else: graphics 36, text 38, icons 40 and the background 42. FIG. 2 shows a typical multimedia display and FIG. 3 shows the difference between successive displays. As shown in these figures, the high variance data 32 and low variance data 35 are differentiated by a stark disparity in their temporal (interframe) and spatial (intraframe) variances. Because the motion picture video data's spatial and temporal variances are relatively high, at a given encoding rate the error in its reconstructed image will be greater than the reconstruction errors in the graphics, text, icons and background data. However, motion picture (high variance) imagery can be compressed such that encoding errors only slightly distort the image's visual quality or are completely imperceptible. Conversely, the low variance data is highly correlated temporally and spatially and is thus easy to compress, but any encoding errors are easily visible and distort the fine structure of the icons, graphics and text. Improved overall compression and reconstructed image quality is achieved by using separate lossy and lossless encoding algorithms for the high and low variance data, respectively. In a perfect lossless algorithm the decompressed images equal the digital images 30 provided by) the frame grabber without distortion or error, while in a lossy algorithm the decompressed algorithm has some amount of distortion or error relative to the original.

Figure 4:
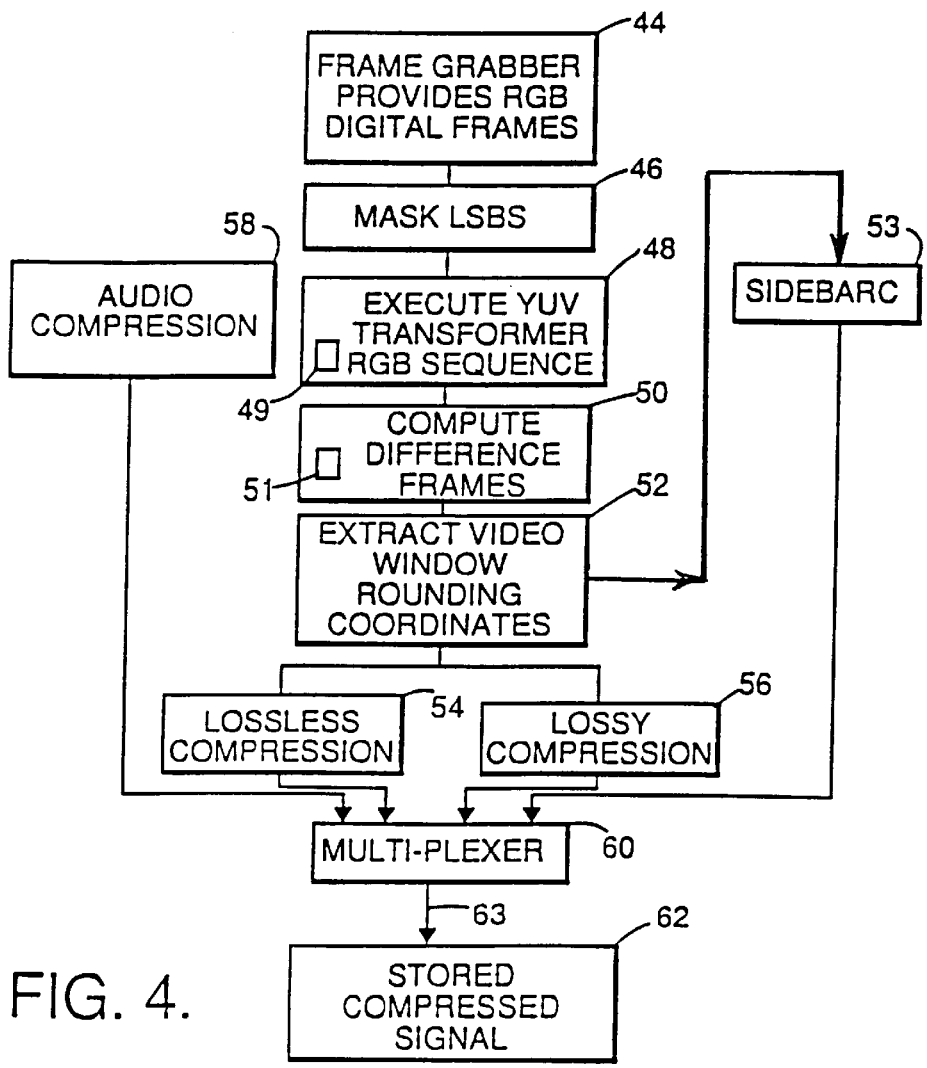
FIG. 4 is a flowchart of a hybrid video compression algorithm.

FIG. 4 is a flowchart of the hybrid video compression algorithm. To achieve the necessary speed, the video compression unit 26 implements the algorithm in hardware, although future advances in computer speed may allow a software implementation. In step 44, the frame grabber 24 provides the compression unit with 24-bit RGB images 30 at 8 bits per pixel for each frame extracted from the video signal 20. In the next step 46, the capture errors of the frame grabber are eliminated by masking off a number of the least-significant-bits (lsbs), e.g., one lsb per image pixel. Each successive set of RGB frames 30 is then transformed in step 48, using a YUV transform to produce Y luminance and UV chrominance components 49. The YUV transform is disclosed on pages 14 and 17 of a new product information sheet "Programmable Color Space Converter and Color Corrector", Brooktree Corporation of San Diego, Calif., 1990. An alternative or slightly modified transform denoted generally as an XYZ transform could be used to provide an X intensity (luminance) component. In the next step 50, the Y, U and V digital frames are subtracted from their respective successive YUV frames to form YUV difference images 51, which are integer valued and can-be represented exactly by a digital codeword. In step 52, the video window's boundary coordinates are extracted from the Y difference image (see FIGS. 7–9 for details) and passed to the lossless and lossy compression algorithms. The window's boundary coordinates are also included in the sideband information 53 sent to the decoder. The video window can be computed for each difference image or for some period in accordance with the requirements of the specific compression algorithms.

In step 54 the low variance portion of each successive digital frame is compressed using a lossless algorithm (see FIG. 5 for details), and in step 56 the high variance portion is encoded using a lossy algorithm (see FIG. 6 for details); these two steps produce respective bitstreams. The accompanying audio track is compressed in step 58 and its bitstream is multiplexed with the compressed high and low variance video data and sideband information bitstreams in step 60. In step 62, the multiplexed digital data 63 is written to the storage device 28.

To playback the digitally stored video signal, a decoder 64 demultiplexes the data 63, performs the respective inverse transforms on the compressed high and low variance signals and audio signals and adds the decoded images back together to produce a sequence of reconstructed digital images 65. A D/A converter 66 converts the reconstructed images 65 into an analog RGB video signal 67 to playback the stored multimedia session. Depending on the display's content and the size of the video window, the compression algorithm can realize compressions of approximately 250:1 with no distortion in the low variance portions and only slightly perceptible distortion in the high variance motion picture portion.

Figure 5:
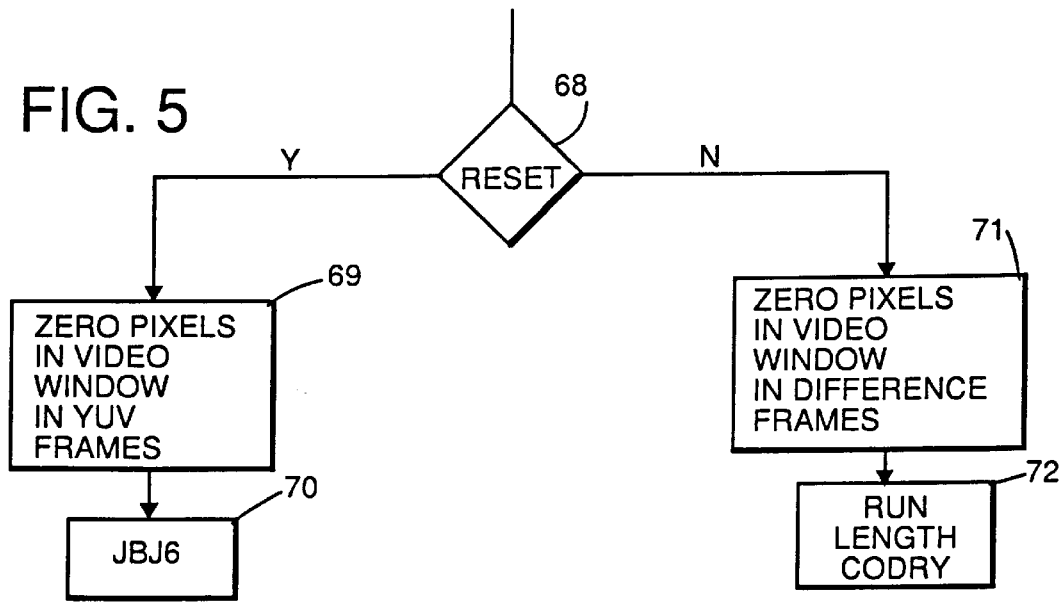
FIG. 5 is a flowchart of the lossless compression algorithm.

FIG. 5 illustrates a preferred embodiment of the lossless compression algorithm for encoding the multimedia display's low variance portion 35. The lossless algorithm is initiated by encoding the first YUV digital frames 49 and thereafter encoding the YUV difference frames 51 computed in step 50. To decode the sequence of compressed frames, the first frame must be transmitted so that the successive frames can be recursively reconstructed by decoding the next difference frame and adding it to the previous frame. It may be desirable to reset the encoding algorithm periodically by directly coding a YUV frame every n frames, e.g., 200 frames, to prevent error propagation due to noise.

Instead of completely removing the pixels in the video window and only encoding the low variance data pixels in the lossless algorithm, those pixels inside the video window can be set equal to zero and encoded with the low variance data. Since the pixels inside the window are all set to a constant value, their information content and effect on the compression of the frame is negligible. Alternatively, the windowed pixels could be removed and the algorithms modified to keep track of the video window. This approach could provide slightly better compression but would be substantially more complicated.

In step 68 of FIG. 5, the algorithm checks the reset condition and selects either the YUV frames 49 or the difference frames 51. In the former case, the pixel values for the respective YUV frames 49 inside the video window 34 are set to zero (step 69) and each frame is compressed with the Joint Bi-level Image Group (JBIG) algorithm (step 70) to produce the encoded bitstream. The JBIG algorithm is described in the Sep. 16, 1991 "CCIT Draft Recommendation T.82 ISO/IEC Committee Draft 11544 Coded Representation of Picture and Audio Information-Progressive Bi-level Image Compression". When the difference frames 51 are selected, the respective YUV difference frames' pixels inside the window are set to zero (step 71) and the frames are encoded using run length codes (step 72) to produce another bitstream. Run length codes are described in Jayant and Noll, Prentice-Hall, "Digital Coding of Waveforms", 1984, pp. 465–485. Other lossless algorithms could be employed in place of the JBIG and run length codes without departing from the scope of the invention.

Figure 6:
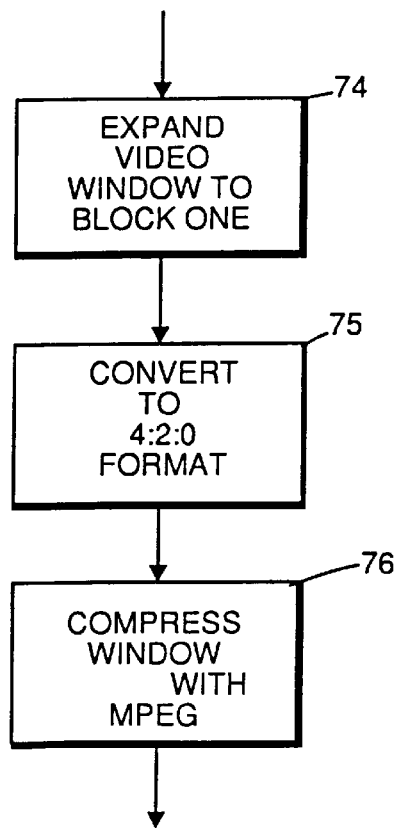
FIG. 6 is a flowchart of the lossy compression algorithm.

FIG. 6 is a flowchart of the lossy compression algorithm for the high variance portion 32 of the multimedia display. The Motion Pictures Expert Group (MPEG) algorithm described in "Information Technology—Generic Coding of Moving Pictures and Associated Audio, Recommendation H.262, ISO/IEC 13818-2", Nov. 25, 1993 is preferably used to compress the data inside the video window and the audio track, although other video compression algorithms are also applicable. MPEG reads 16×16 blocks of pixel data and processes groups successive frames, e.g., 12–15. To accommodate the standard, the coordinates of the video window are updated for the first image of each group (FIG. 2, step 52) and modified in step 74 to extend the window to fit the MPEG block size. In step 75, the YUV images 49 are converted into a 4:2:0 format to be compatible with the MPEG algorithm. For every 2×2 block of pixels the Y luminance value is the value of each pixel and the U and V values equal the average of the four pixels from their respective frames. In step 76, the 4:2:0 formatted pixels inside the extended window are encoded with the MPEG algorithm to produce the bitstream. The decoder strips out the additional pixels prior to reconstructing the display.

Figure 7:
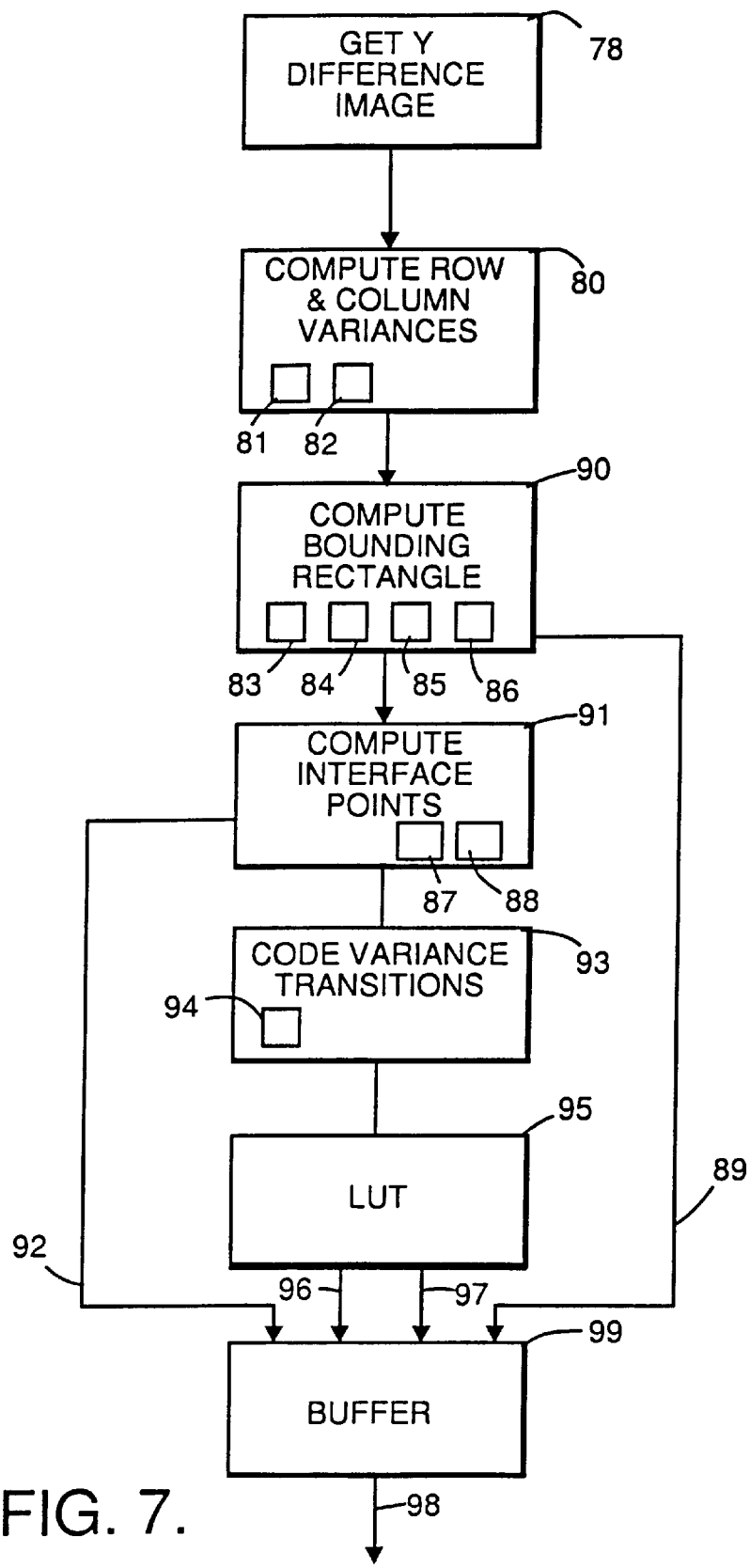
FIG. 7 is a flowchart of the video window detection algorithm.
Figure 8A:
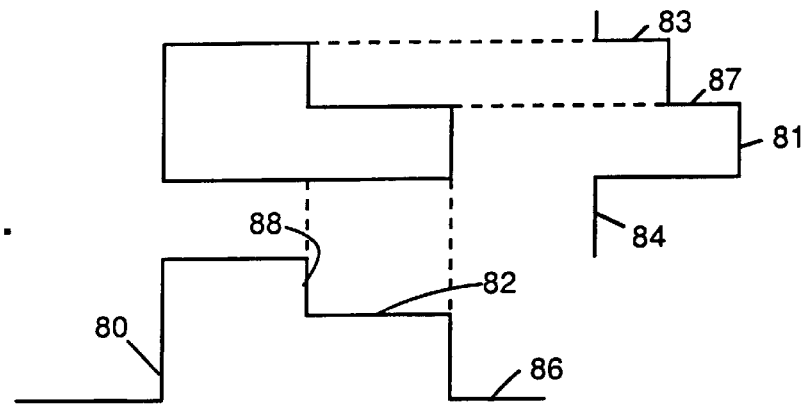
FIGS. 8a–8d illustrate the steps of the detection algorithm of FIG. 7.
Figure 8B:
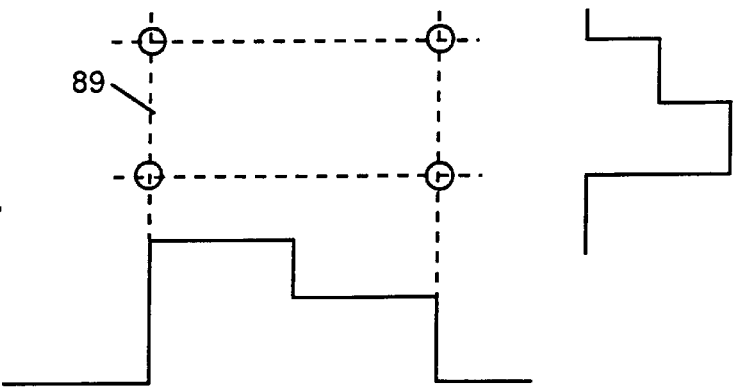
Figure 8C:
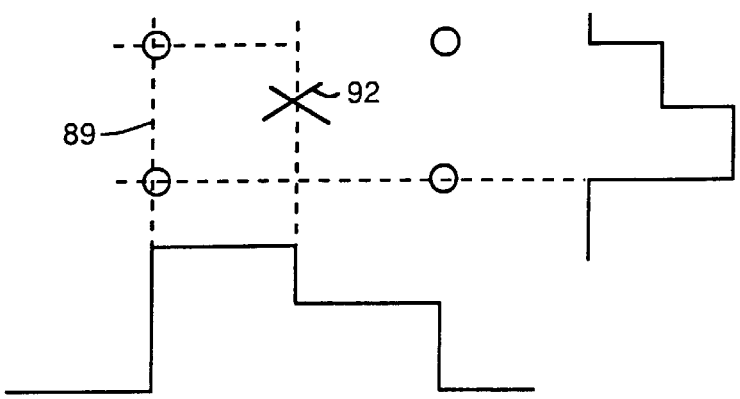

FIG. 7 is a flowchart of a suitable video window detection algorithm, which utilizes the standard rectangular geometry of the workstation's windowing environment and the contrast in signal characteristics between the motion picture and graphics, text, icons and background portions of the display. In step 78, the algorithm receives the Y difference image. An activity measure, e.g., the variance, is computed in step 80 for each row and each column, with the variances 81, 82 projected onto the vertical and horizontal axes, respectively. The variance of each row or column is given by:

$$\sigma^2 = \frac{1}{n}\sum_{i=1}^{n}(l_i - m)^2$$

where $\sigma^2$ is the variance, $l_i$ is the pixel luminance value, m is the mean and n is the number of pixels in the row or column. The mean m of the difference images is normally approximately zero. The variance projections have sharp transitions at the video window's edge coordinates 83, 84, 85, 86 and at the interior coordinates 87, 88 where the window's width with respect to the particular axis changes, as shown in FIG. 8*a*. The coordinates of a bounding rectangle 89 for the video window 34 are extracted from the first (83,85) and last (84,86) transitions of each projection (step 90) and specify the size and location of the window, as shown in FIG. 8*b* and denoted by a "0". In step 91, the interior row transition coordinates (87) are matched to the interior column transition coordinates (88) to specify the interior corner points 92, as shown in FIG. 8*c* and denoted by an "X".

To identify the window's shape, the projections' transitions are coded (step 93) with a 10-digit transition code 94. The code's format restricts the number of transitions to five or less in each projection 81 and 82; any projection with more than five will default to the bounding rectangle. A transition from low to high is indicated by a "1" and from high to low as a "0". Since the first transition of each projection is always a "1" and the last is always a "0", only the interior transitions are coded. The first two flags specify the number of row projection interior transitions (0–3), flags 3–5 specify the transitions, flags 6–7 specify the number of column projection interior transitions and flags 8–10 specify the transitions. Any unused flags in positions 3–5 and 8–10 are designated by an "X". For example, a simple rectangular window would be coded "00XXX00XXX".

Figure 8D:
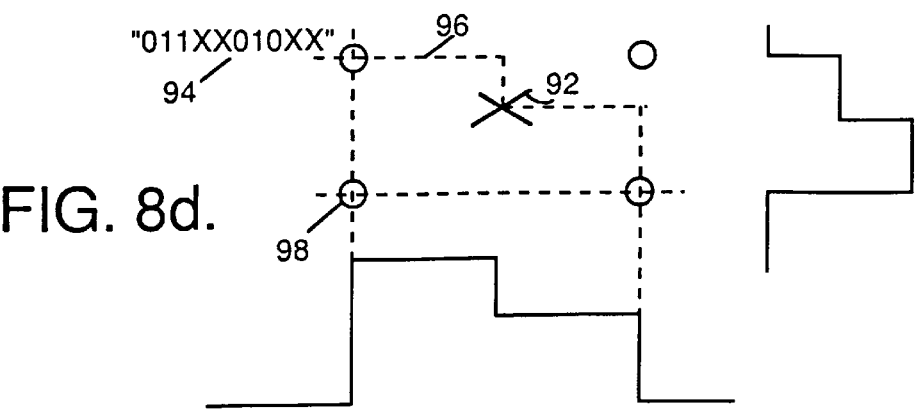

In step 95, a look-up-table (LUT) which contains the codes for a number of common shapes outputs a shape identifier 96 and a set of instructions 97 that specify how the interior corner points 92 are used to define the video window's boundary coordinates 98, as shown in FIG. 8*d*. If the code 94 isn't included in the LUT, the window defaults to the bounding rectangle 89. The boundary coordinates, interior points and shape identifier are sent to a buffer 99 that holds the video window descriptors for a few frames, e.g., 3. If the information video window is approximately constant over the frames, it is output to the compression algorithm. If a window is identified for only 1 or 2 frames it is discarded. This prevents the opening of a graphics or text window or an icon, which would cause a large variance in one difference image, from causing the algorithm to misidentify a video window.

Figure 9A:
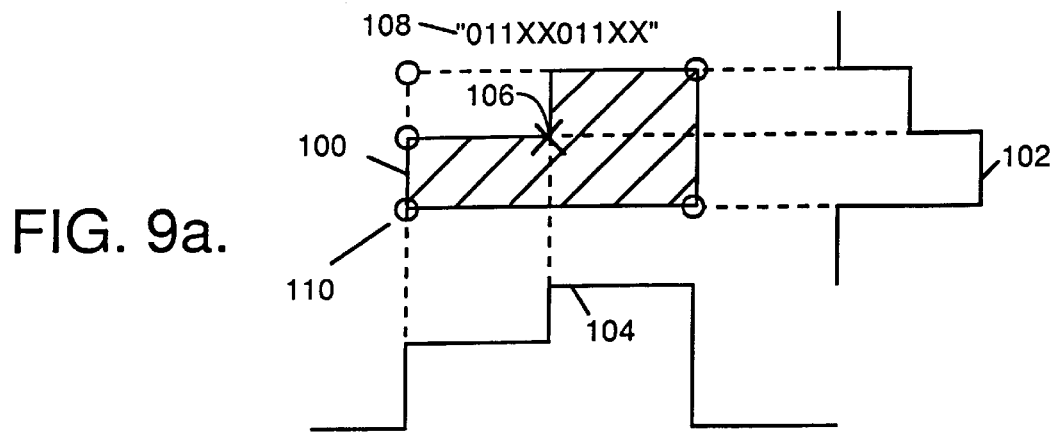
FIGS. 9a–9d show typical video windows, their projections and corresponding transition codes.
Figure 9B:
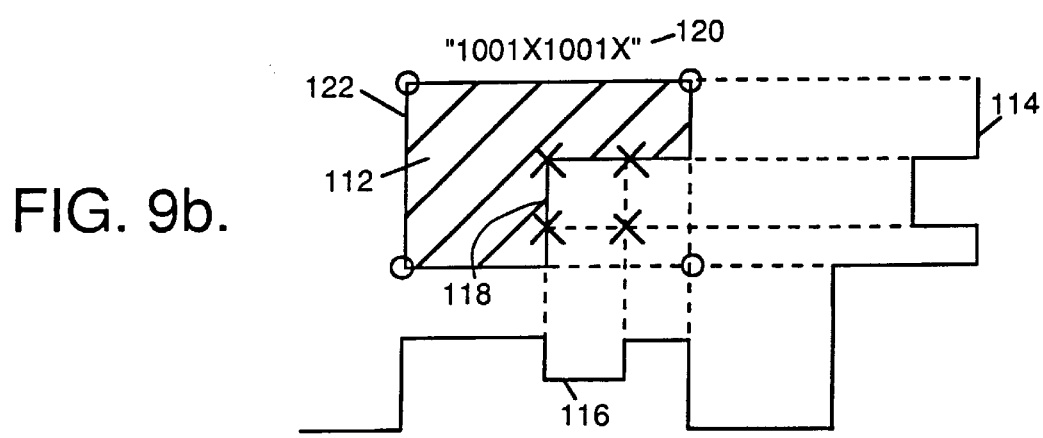
Figure 9C:
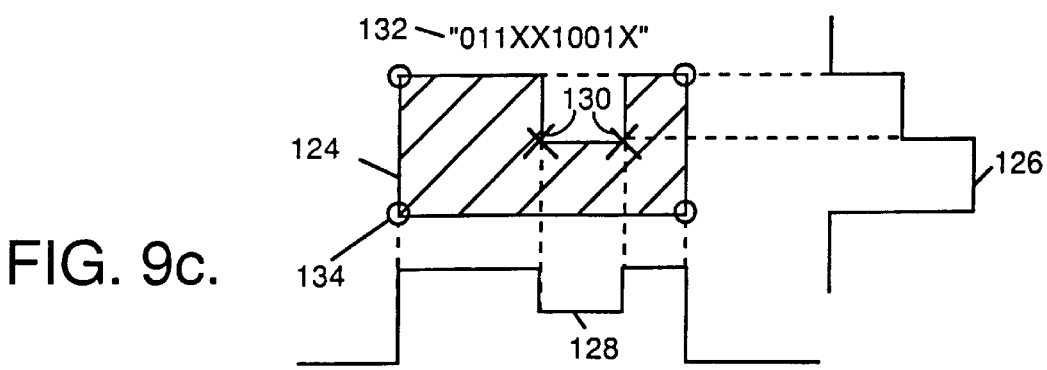
Figure 9D:
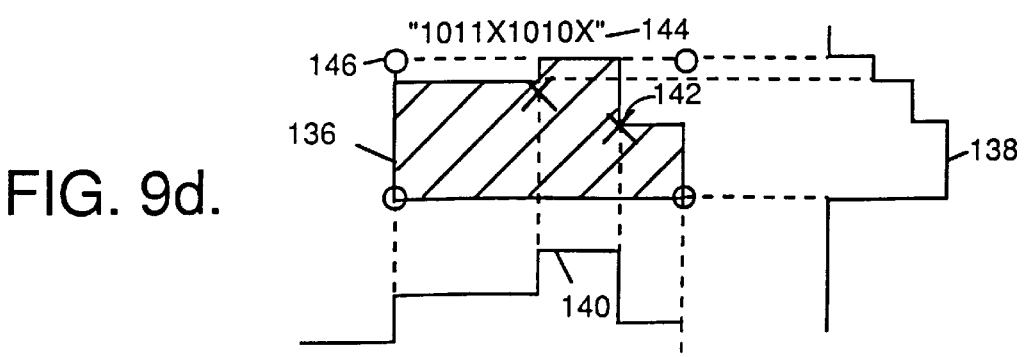

FIGS. 9*a*–*d* illustrate four common video window shapes, their variance projections, boundary coordinates, transition codes and interior points. FIG. 9*a* shows an upper-left occluded window 100 with row and column variance projections 102 and 104 respectively, interior point 106, transition code 108 and boundary coordinates 110. FIG. 9*b* shows a video window 112 having a rectangular void in the middle with row and column variance projections 114 and 116 respectively, interior points 118, transition code 120 and boundary coordinates 122. FIG. 9*c* shows a video window 124 having a notch in its upper side with row and column variance projections 126 and 128 respectively, interior points 130, transition code 132 and boundary coordinates 134. FIG. 9*d* shows an irregularly shaped video window 136 with row and column variance projections 138 and 140 respectively, interior points 142, transition code 144 and boundary coordinates 146. The bounding rectangle's coordinates, the interior points' coordinates and the window's shape identification are included in the sideband information. The decoder 64 is provided with a table that matches the window ID with the proper set of instructions for processing the interior points 92. This algorithm identifies the video window's size, location and shape and produces its boundary coordinates directly from the sequential difference images without receiving any input from the workstation's window manager. This approach makes the screen recorder a workstation independent device.

In the described embodiment, the screen recorder is used in conjunction with a high resolution multimedia workstation to digitally record and compress work sessions while maintaining the original high resolution display. The screen recorder can be used for applications such as education/training, communication, archiving, investigation and product marketing. The screen recorder can also be used to digitally record the analog RGB video signal for high definition television (HDTV) by making the video window encompass the entire display. For improved performance, a more advanced algorithm may be developed for separating the relatively constant and varying portions of the video signal throughout the display could be employed.

While several illustrative embodiments of the invention have been shown and described, numerous variations and alternate embodiment will occur to those skilled in the art. Such variations and alternate embodiments are contemplated, and can be made without departing from the spirit and scope of the invention as defined in the appended claims.

We claim:

1. A screen recorder for recording an analog video signal that modulates a video display, said analog video signal having a resolution greater than a standard National Televisions Systems Committee (NTSC) resolution of 525 lines per frame, comprising:

a high resolution multimedia computer workstation that generates said greater resolution video signal, said signal including high and low variance data, said high and low variance data both having temporal and spatial variances, said high and low variance data having a high disparity in both their temporal and spatial variances, said workstation having a digital display system, the variance of each row or column of said video display is given by:

$$\sigma^2 = \frac{1}{n}\sum_{i=1}^{n}(l_i - m)^2$$

where $\sigma^2$ is the variance, $l_i$ is the pixel luminance value, m is the mean and n is the number of pixels in the row or column, said digital display system further having an output, said screen recorder connected solely to said digital display system output;

an analog to digital frame grabber for converting the greater resolution video signal into a sequence of digital frames in a machine independent format;

a video compression unit for compressing the sequence of digital frames into compressed digital signals, wherein said compression unit separates each digital frame into the high and low variance data and compresses each independently into compressed first and second digital signals; and a storage device for storing the compressed digital signals.

2. The screen recorder of claim 1, wherein said screen recorder is a portable, workstation independent unit that is electrically coupled to the workstation to receive said video signal.

3. The screen recorder of claim 1, wherein said storage device is a hard disk, an optical drive or a digital tape.

4. The screen recorder of claim 1, wherein said compression unit generates said compressed first signal as an approximation of the high variance data and said compressed second signal as an exact representation of the digital low variance data.

5. A method for recording an analog video signal wherein a high resolution multimedia computer workstation that displays high and low variance video data produces the analog video signal, the analog video signal having a resolution greater than a standard National Television Systems Committee (NTSC) resolution of 525 lines per frame, the method comprising:

converting the analog video signal into a sequence of digital frames;

compressing the sequence of digital frames into compressed digital signals, and said digital frame compression step comprises:

separating each digital frame into said high and low variance video data, said high and low variance data both having temporal and spatial variances, said high and low variance data having a high disparity in both their temporal and spatial variances, and said workstation having a digital display system, the variance of each row or column of said video display is given by:

$$\sigma^2 = \frac{1}{n}\sum_{i=1}^{n}(l_i - m)^2$$

where $\sigma^2$ is the variance, $l_i$ is the pixel luminance value, m is the mean and n is the number of pixels in the row or column, said digital display system further having an output, connecting said screen recorder solely to said digital display system output;

compressing said high variance data with a lossy compression algorithm to form a first compressed digital signal;

compressing said low variance data with a lossless compression algorithm to form a second compressed digital signal; and storing the compressed first and second digital signals.

6. A screen recorder for recording an analog video signal that modulates a video display, said analog video signal having a resolution greater than a standard National Television Systems Committee (NTSC) resolution of 525 lines per frame, wherein said screen recorder is a portable, workstation independent unit that is electrically coupled to the workstation to receive said video signal, comprising:

a high resolution multimedia computer workstation that generates said greater resolution video signal, said signal including high and low variance data, said high and low variance data both having temporal and spatial variances, said high and low variance data having a high disparity in both their temporal and spatial variances, and said workstation having a digital display system, the variance of each row or column of said video display is given by:

$$\sigma^2 = \frac{1}{n}\sum_{i=1}^{n}(l_i - m)^2$$

where $\sigma^2$ is the variance, $l_i$ is the pixel luminance value, m is the mean and n is the number of pixels in the row or column, said digital display system further having an output said screen recorder connected solely to said digital display system output;

an analog to digital frame grabber for converting the greater resolution video signal into a sequence of digital frames;

a video compression unit for compressing the sequence of digital frames into compressed video signals, wherein said compression unit separates each digital frame into the high and low variance data and compresses each independently into compressed first and second digital signals, wherein said compression unit generates said compressed first signal as an approximation of the high variance data and said compressed second signal as an exact representation of the low variance data; and a storage device for storing the compressed digital signals wherein said storage devise is a hard disk, an optical drive or a digital tape.

7. The method of claim 5, wherein the step of separating each digital frame comprises:

comparing a digital frame with a later digital frame to obtain a difference frame comprising multiple data bytes, computing measures of variance associated with sets of data bytes in the difference frame, and defining a region of high variance data in at least one of the digital frames, based on transitions in the computed measures of variance in the difference frame.

8. The screen recorder of claim 6, wherein said video compression unit is arranged to compare a digital frame with a later digital frame to obtain a difference frame comprising multiple data bytes, compute measures of variance associated with sets of data bytes in the difference frame, and identify the high variance data as the data within a region of at least one of the digital frames based on transitions in the computed measures of variance in the difference frame.

* * * * *